3,812,194
NOVEL PROCESS FOR PREPARING 6-HALO-3-METHYLPHENOLS

Ira Starer, Somerville, Carroll Sherman Montgomery, Piscataway, and Edward John O'Bara, Manville, N.J., assignors to American Cyanamid Company, Stamford, Conn.
No Drawing. Filed Jan. 6, 1970, Ser. No. 1,036
Int. Cl. C07c 39/26
U.S. Cl. 260—623 R     2 Claims

ABSTRACT OF THE DISCLOSURE

This disclosure describes a multistep process for the preparation of 6-halo-3-methylphenols from 6-nitro-3-methylphenol; the products of the process being useful in the preparation of anti-allergenic agents.

BRIEF SUMMARY OF THE INVENTION

This invention relates to the preparation of 6-halo-3-methylphenols from 6-nitro-3-methylphenol, a readily available starting material obtained by the direct nitration of m-cresol. More particularly, it relates to a novel preparative method involving the reaction of 6-nitro-3-methylphenol (I) with a lower alkanesulfonyl halide to afford the corresponding 4-nitro-3-lower alkanesulfonyloxytoluene (II); reduction of (II) to the corresponding 4-amino derivative (III); diazotization of (III) and replacement of the diazonium group with halogen to afford the 4-halo-3-lower alkanesulfonyloxytoluene (IV); and hydrolysis of (IV) to give the desired 6-halo-3-methylphenol (V). The products (V) of the novel process are starting materials in the preparation of the anti-allergenic agents 4-(chloro or bromo)-3-hydroxybenzyloxyamine phosphate.

DETAILED DESCRIPTION OF THE INVENTION

This invention relates to the preparation of 3-methylphenol having a chloro or bromo substituent in the 6-position, ortho to the hydroxyl group.

Halogenation of phenolic compounds in which the para position and at least one ortho position are unsubstituted usually produces a halogenation product rich in the para isomer. Thus, it is difficult to obtain an ortho-halo isomer from these starting materials by any direct practical halogenation procedure presently known. This is true, for example, in the bromination of m-cresol, the various meta-substituted xylenols, and other lower alkyl substituted phenols. For this reason the ortho isomers are relatively expensive and not readily available as intermediates in the manufacture of known products.

One method for obtaining the desired ortho isomers is to form a bromination product by conventional means and convert the brominated materials to the desired ortho isomers. One method of producing ortho isomers "indirectly" is disclosed in U.S. Pat. No. 3,293,309. Therein it is said that 2-bromophenol, 6-bromo-o-cresol and 6-bromo-m-cresol are obtained from the corresponding 4-bromo isomer by heating the latter at a temperature from 100° C. to 200° C. in the presence of an acidic catalyst for a period of time sufficient for a substantial degree of isomerization to take place. The acidic catalyst is the hydrogen bromide generated in the bromination step or a Friedel-Crafts catalyst such as $AlCl_3$, $AlBr_3$, $FeCl_3$, and the like, or a combination of two or more of these. Best results are reported with a combination of hydrogen bromide and a non-volatile co-catalyst, preferably phosphoric acid. The difficulty with this process is that isomerization is carried out at high temperatures which results in a relatively high concentration of dibrominated and decomposition products. Moreover, in the case of m-alkyl-phenols, e.g., m-cresol, the isomerization leads to almost equal amounts of the 2-bromo and 6-bromo isomers. Although both isomers are ortho-bromo substituted, it is usually desirable to obtain one or the other of these isomers in predominant amounts. The process of the prior art is not satisfactory in such cases. The process is also disadvantageous from the standpoint of the need to handle highly corrosive hot hydrogen bromide.

Another method for obtaining the desired ortho isomers is reported by Huston and Peterson, J. Am. Chem. Soc., 55, 3879, 1933) who converted 6-nitro-3-methylphenol to 6-bromo-3-methyl-phenol via reduction of the nitro group, diazotization and replacement of the diazonium group by bromine. Unfortunately, this relatively straightforward process results in low overall yields with m-cresol. When 6-nitro-3-methylphenol benzenesulfonate was subjected to the same series of reactions in addition to a final hydrolysis step, the yield was markedly reduced in the bromination step due to formation of a by-product which drastically reduced the overall yield from m-cresol.

In accordance with the present invention, it has been discovered that if a lower alkanesulfonate is used as a protective group for the phenolic hydroxyl, the conversion of 6-nitro-3-methylphenol to 6-halo-3-methylphenol may be accomplished in an overall yield of about 75% of pure product. The novel process of the present invention proceeds as set forth in the following reaction scheme:

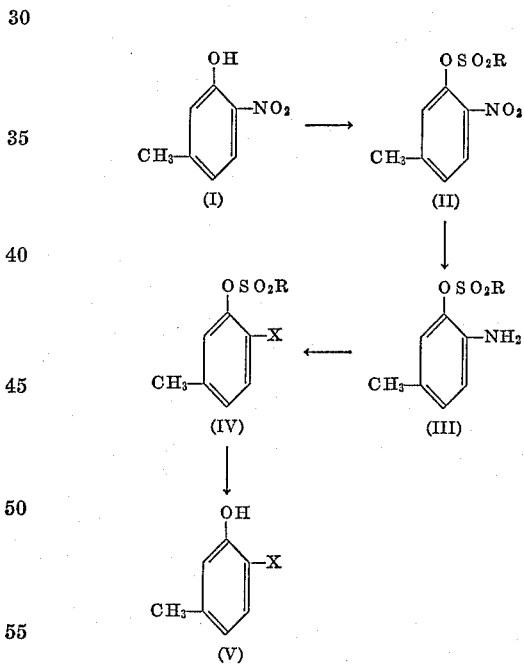

wherein R is lower alkyl and X is chloro or bromo. Suitable lower alkyl groups contemplated by the present invention are those having from 1 to 4 carbon atoms such as, for example, methyl, ethyl, isopropyl, n-butyl, sec-butyl, etc.

In accordance with the above reaction scheme, 6-nitro-3-methylphenol (I) is treated with a lower alkanesulfonyl halide ($R-SO_2X'$ wherein R is lower alkyl and X' is chloro or bromo) whereby the corresponding 4-nitro-3-lower alkanesulfonyloxytoluene (II) is obtained. Suitable lower alkanesulfonyl halides which may be employed are, for example, methanesulfonyl bromide, ethanesulfonyl chloride, isopropanesulfonyl bromide, n-butanesulfonyl chloride, sec-butanesulfonyl chloride, and the like. The reaction is best carried out in the presence of an acid acceptor, such as sodium bicarbonate, potassium bicarbonate, soda ash, triethylamine, tri-n-propylamine, pyridine, α-picoline, etc. A preferred embodiment of this procedure is to carry out the reaction in an excess of organic acid acceptor, for example pyridine, as solvent. If desired, a solvent inert to the reactants may also be employed. Suitable inert solvents are, for example, carbon tetrachloride, chlorobenzene, dimethylformamide, dioxane, tetrahydrofuran, and the like. The reaction is preferably carried out at a temperature of from about 0° C. to about 70° C. for a period of time of from about 15 minutes to several hours or more. The product (II) may be readily isolated from the reaction mixture by standard procedures such as concentration, dilution with a non-solvent for the product, etc.

The reduction of the 4-nitro-3-lower alkanesulfonyloxytoluene (II) to the corresponding 4-amino-3-lower alkanesulfonyloxytoluene (III) can be accomplished by common chemical or catalytic methods known to reduce nitro groups, for example, iron and hydrochloric acid, tin and hydrochloric acid, zinc in neutral or basic solutions, $(NH_4)_2S$, hydrogen and palladium or platinum, and the like. It is best accomplished with iron and hydrochloric acid in an essentially aqueous or lower alcoholic medium at the reflux temperature of the solvent for a period of time such that the reduction is essentially complete. The product (III) may be readily isolated from the reaction mixture by standard procedures such as extraction from a water medium or precipitation from a lower alkanol-water medium.

The diazotization of the 4-amino-3-lower alkanesulfonyloxytoluene (III) can be carried out according to conventional procedures such as adding sodium nitrite either in aqueous solution or as a solid to a solution of the amine (III) in an aqueous mineral acid at a temperature below 10° C. The diazotization is preferably carried out by dissolving the sodium nitrite in concentrated sulfuric acid and adding this to a solution of the amine in glacial acetic acid at a temperature of 15–25° C. An excess of mineral acid must be present over and above the amount needed to form the salt of the amine (III) and to decompose the sodium nitrite. The resulting solution of diazonium salt of (III) is used directly in the next step as follows. The diazo solution is added over a period of 10–30 minutes to a solution of cuprous chloride or cuprous bromide dissolved in the corresponding concentrated aqueous hydrohalic acid. During the addition, the halogenating solution is kept at a temperature of about 10° C. to about 100° C., preferably room temperature of about 25° C. After the addition of the diazo solution to the halogenating solution, the resulting solution is stirred at 10–100° C., preferably at about 25° C., for a period of time of from about 15 minutes to an hour or more. The 4-halo-3-lower alkanesulfonyloxytoluene (IV) may be readily isolated from the reaction mixture, for example, by extraction with chloroform, carbon tetrachloride, or other suitable solvent, followed by concentration of the extract.

The hydrolysis of the 4-halo-3-lower alkanesulfonyloxytoluene (IV) to the corresponding 6-halo-3-methylphenol (V) may be readily accomplished in aqueous or aqueous-alcoholic solutions of an alkali metal hydroxide at a temperature of about 50° C. to about 100° C. for a period of time such that a substantial degree of hydrolysis occurs. Conveniently, either potassium hydroxide or sodium hydroxide may be employed at a concentration of from about 18% to about 50% in water, at a temperature of about 70° C. to about 100° C. for a period of time of about 15 minutes to an hour or more. Upon cooling and acidifying the reaction mixture, the product (V) crystallizes therefrom and may be removed by filtration. Alternatively the product may be isolated by steam distillation of the acidified mixture.

The invention will be described in greater detail in conjunction with the following specific examples.

EXAMPLE 1

Preparation of 6-nitro-m-cresol m-Cresol (140 grams, 1.3 moles) was dissolved in glacial acetic acid (140 grams) and the solution cooled to —5° C. To this solution was added over a period of 1.5 hours a solution of 200 grams of nitric acid (sp. gr. 1.5) in 400 grams glacial acetic acid which was cooled to —15° C. During the addition the temperature was kept below 0° C. The reddish-brown mixture was then poured in one kg. of ice and 1.5 kg. of water. Steam distillation afforded 51 grams (26% yield) of 6-nitro-m-cresol.

EXAMPLE 2

Preparation of 4-nitro-3-methanesulfonyloxytoluene 6-nitro-m-cresol (153 grams, 1.0 mole) was dissolved in 306 ml. pyridine. Methanesulfonyl chloride (180 grams, 1.57 moles) was added dropwise over a period of about 30 minutes, keeping the temperature below 25° C. The mixture was stirred for 30 minutes at 25°–30° C., then cooled to 0°–5° C. Methanol (150 ml.) and water (610 ml.) were added below 15° C. The oily product crystallized after stirring for about 1 hour at 0°–5° C. and was filtered and washed with water. There was obtained 222 grams (96% yield) of product, M.P. 44.5°–46.6° C.

EXAMPLE 3

Preparation of 4-amino-3-methanesulfonyloxytoluene

A mixture of 4-nitro-3-methanesulfonyloxytoluene (23.1 grams, 0.1 mole), iron powder (17.6 grams), conc. HCl (5.9 grams) and water (147 ml.) was heated at reflux for 12 hours reaction is complete in 2 hours), cooled to 25° C., chloroform (147 ml.) added and the mixture filtered. The organic phase was separated and the aqueous phase again extracted with 50 ml. of chloroform. The combined extracts were dried over magnesium sulfate and concentrated in vacuo to give 18.6 grams (92.5%) of product, M.P. 95.5° –99° C.

EXAMPLE 4

Preparation of 4-amino-3-methanesulfonyloxytoluene

To a mixture of 23.1 g. (0.10 mole) of 4-nitro-3-methanesulfonyloxytoluene, 17.6 g. (0.315 g.-atom) of iron powder, 75 ml. of isopropanol and 72 ml. of water was added 5.9 g. (0.058 mole) of conc. HCl. The mixture was heated to reflux (83°–84° C.), and maintained for 2.75 hours, and the mixture filtered hot. The filter cake was washed with 10 ml. of hot *iso*propanol and the filtrate cooled to 0°–50° C. The product was filtered and washed with 20 ml. of cold 50% aqueous *iso*propanol and dried. There was obtained 18.06 g. (90%) of 4-amino-3-methanesulfonyloxytoluene, M.P. 97°– 99.5° C.

EXAMPLE 5

Preparation of 4-bromo-3-methanesulfonyloxytoluene

To a solution of sodium nitrite (1.44 grams, 0.021 mole) in conc. sulfuric acid (10 ml.) was added a solution of 4-amino-3-methanesulfonyloxytoluene (3.82 grams, 0.019 mole) in glacial acetic acid (60 ml.) at 0°–5° C. over a period of 30 minutes. The resultant solution was added over 30 minutes to a solution of cuprous bromide (5.4 grams, 0.038 mole) in 48% hydrobromic acid (25 ml.) at 25° C. The resultant mixture was stirred for 30 minutes, diluted with water (100 ml.), and extracted with chloroform. The extracts were dried over magnesium sulfate, and concentrated in vacuo to give an oil (5 grams, 99% yield), which was confirmed by thin-layer chromatography and infrared spectrum to be the desired compound.

EXAMPLE 6

Preparation of 6-bromo-m-cresol

A mixture of 4-bromo-3-methanesulfonyloxytoluene (10.0 grams, 0.038 mole), 50% aqueous sodium hydroxide (18.2 grams, 0.23 mole) and 72 ml. water was refluxed for 30 minutes. The resulting deep amber solution was cooled to 25° C. and the pH adjusted to about 4 with 16.5 ml. of conc. HCl. The oily product slowly crystallized and was filtered, washed with water and dried. There was obtained 6.03 grams (85% yield) of a brownish solid, M.P. 36.5°–38.5° C., which was identical in infrared spectrum with an authentic sample of the desired compound.

EXAMPLE 7

Preparation of 4-bromo-3-benzenesulfonyloxytoluene

Sodium nitrite (1.44 grams, 0.021 mole) was dissolved in conc. sulfuric acid (10 ml.). This solution was cooled to 0° C. and to it was added dropwise over 30 minutes a solution of 4-amino-3-benzenesulfonyloxytoluene (5.0 grams, 0.019 mole) in glacial acetic acid (60 ml.). The resultant solution was added dropwise over 30 minutes at 25°–30° C. to cuprous bromide (2.72 grams, 0.019 mole) in 48% hydrobromic acid (25 ml.). After reaction was complete (about 30 minutes), 100 ml. water was added and the colorless solid filtered. There was obtained 5.38 grams. Gas-liquid chromatography showed the presence of two components: (A)—42% and (B)—58%. The crude product was recrystallized from methanol and afforded 1.43 grams of colorless solid, M.P. 153°–155° C., retention time identical with (B) by GLC. This compound was shown to be 2-oxy-4-methyl-1,1'-diphenyl-2'-sulfonic acid sultone by infrared spectrum, nuclear magnetic resonance spectrum, and elemental analysis. A second crop of crystals (1.29 grams), M.P. 91°–95° C., had a retention time by GLC identical with component (A). This was shown to be 4-bromo-3-benzenesulfonyloxytoluene by infrared spectrum.

What is claimed is:

1. A process for the preparation of a compound of the formula:

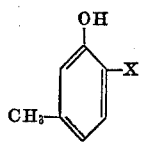

wherein X is selected from the group consisting of chloro and bromo which comprises sulfonylating 6-nitro-3-methyl-phenol with a compound of the formula: R—SO$_2$X' wherein R is lower alkyl (C$_1$–C$_4$) and X' is selected from the group consisting of chloro and bromo in an inert solvent and in the presence of an acid acceptor, forming by said sulfonylation 4-nitro-3-lower alkane (C$_1$–C$_4$) sulfonyloxytoluene of the formula:

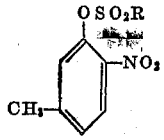

wherein R is as hereinabove defined, separating said 4-nitro-3-lower alkane (C$_1$–C$_4$) sulfonyloxytoluene from the reaction mixture and reducing said 4-nitro-3-lower alkane (C$_1$–C$_4$) sulfonyloxytoluene with iron and hydrochloric acid in an essentially aqueous or alcoholic medium, forming by said reduction a 4-amino-3-lower alkane (C$_1$–C$_4$) sulfonyloxy toluene of the formula:

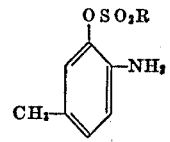

wherein R is as hereinabove defined, separating said 4-amino-3-lower alkane (C$_1$–C$_4$) sulfonyloxytoluene from the reaction mixture and diazotizing said 4-amino-3-lower alkane (C$_1$–C$_4$) sulfonyloxytoluene in a diazotizing solution comprising sodium nitrite and a mineral acid at a temperature below about 10° C. adding the resultant solution of diazonium salt to a halogenating solution of a cuprous halide selected from the group consisting of cuprous chloride and cuprous bromide in the corresponding concentrated aqueous hydrohalic acid, forming by said diazotization and halogenation a 4-halo-3-lower alkane (C$_1$–C$_4$) sulfonyloxytoluene of the formula:

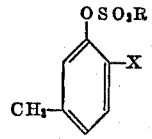

wherein R and X are as hereinabove defined, separating said 4-halo-3-lower alkane (C$_1$–C$_4$) sulfonyloxytoluene from the reaction mixture and hydrolyzing off the RSO$_2$— group from the 4-halo-3-lower alkane (C$_1$–C$_4$) sulfonyloxytoluene.

2. The process of claim 1 wherein X is bromo, R is methyl, X' is chloro, the halogenating solution consists of cuprous bromide in concentrated aqueous hydrobromic acid, and the RSO$_2$— group is hydrolyzed off by means of aqueous alkali metal hydroxide.

References Cited

UNITED STATES PATENTS

| | | | |
|---|---|---|---|
| 2,735,873 | 2/1956 | Guris | 260—628 |
| 2,835,708 | 5/1958 | Kamlet | 260—628 |
| 2,489,423 | 11/1949 | Lawson et al. | 260—623 R |
| 3,159,685 | 12/1964 | Bradley et al. | 260—619 |
| 3,320,301 | 5/1967 | MacLean | 260—456 |

OTHER REFERENCES

Huston et al.: "J.A.C.S.," vol. 55, pp. 3879–3882.

HOWARD T. MARS, Primary Examiner
W. B. LONE, Assistant Examiner

U.S. Cl. X.R.

260—456 R, A, 621 R

UNITED STATES PATENT OFFICE
CERTIFICATE OF CORRECTION

Patent No. 3,812,194  Dated May 21, 1974

Inventor(s) Ira Starer, Carroll Sherman Montgomery and Edward John O'Bara

It is certified that error appears in the above-identified patent and that said Letters Patent are hereby corrected as shown below:

Column 3, line 69 "18%" should read -- 10% --.

Signed and sealed this 8th day of October 1974.

(SEAL)
Attest:

McCOY M. GIBSON JR.
Attesting Officer

C. MARSHALL DANN
Commissioner of Patents